July 6, 1965
D. J. WING
3,193,335
BEARING
Filed Sept. 30, 1960
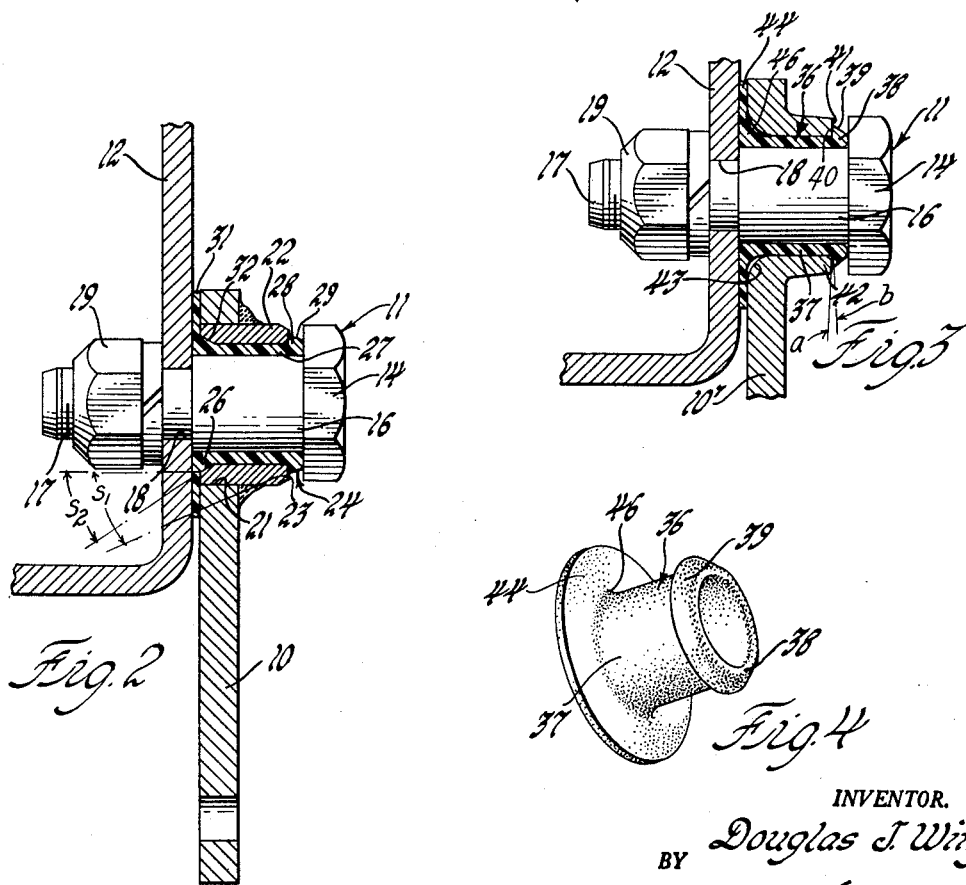
INVENTOR.
Douglas J. Wing
BY
A. M. Heiter
ATTORNEY

United States Patent Office 3,193,335
Patented July 6, 1965

3,193,335
BEARING
Douglas J. Wing, St. Clair Shores, Mich., assignor to General Motors Corporation, Detroit, Mich., a corporation of Delaware
Filed Sept. 30, 1960, Ser. No. 59,639
2 Claims. (Cl. 308—22)

This invention relates to a bearing, particularly to a one-piece grommet type bearing.

The invention provides an insertable grommet type bushing or bearing having a flange at each end of the cylindrical portion to lock the bushing in a bore of a member. The bushing is preferably made of a bearing grade plastic material such as nylon, a polyamide plastic, Teflon, a polytetrafluoroethylene plastic, and Delrin, a polyoxymethylene type plastic. These plastic materials have a high wear resistance and a high impact strength. Though they have a low cold flow rate and a high compressive strength, their modulus of elasticity is sufficient to provide a large degree of deformation under stress before the yield point is reached.

The bushing is intended to be employed in a bearing bore of a lever having at one side a pilot taper and at the other side a sharp edge at an angle of 90° or slightly less than 90° to the bore. The cylindrical bushing has at the pilot end a small flange having a tapered outer surface and a sharp locking corner between the small flange and the cylindrical portion. The head end of the bushing has a large head flange having a fillet portion between the head flange and the cylindrical portion, having a surface substantially fitting the tapered pilot portion of the bore. The bushing is forced into the bore with the tapered flange piloting the bushing as it engages the tapered pilot entrance portion of the bore to gradually compress the pilot flange portion of the bushing sufficiently to pass through the bore. It is preferred that there be a slight clearance between the head flange of the bushing and the tapered pilot portion of the bore so that the bushing may be pushed through the hole beyond the final position to insure that the pilot flange expands and grips the edge portion of the wall of the member surrounding the bore.

An object of the invention is to provide a grommet type bushing having a tapered pilot flange and a larger head flange for insertion in a bore having a small tapered pilot portion at the entrance without stressing the bushing beyond the yield point and a taper between the cylindrical portion of the bushing and the head flange substantially fitting the pilot taper of the bore.

These and other objects of the invention will be more apparent from the following description of the preferred embodiments of the invention shown in the accompanying drawing.

FIGURE 1 is an elevational view of the lever employing the bearing bushing.

FIGURE 2 is a section of FIGURE 1 on the line 2—2 showing the bearing assembly.

FIGURE 3 shows a bearing assembly employing a modified bushing.

FIGURE 4 is a perspective of the bushing.

The invention is illustrated in an assembly consisting of a lever 10 pivoted by a shaft bolt 11 to a frame 12. The shaft bolt 11 has a head 14, a cylindrical bearing portion 16, and a reduced diameter threaded portion 17 extending through the aperture 18 of frame 12 and secured in place by bolt and lock washer 19. The lever 10 has an aperture 21 in which the cylindrical bearing sleeve 22 is welded. The bearing sleeve 22 has a face 23 preferably including an angle a few degrees less than 90° or at least no more than 90°. The bearing sleeve 22 has at the other end a taper 26 to aid insertion of the bearing bushing 24 in the sleeve. Thus bearing sleeve 22 has a bearing bore having a cylindrical portion between the face 23 and the tapered portion 26. The bearing bushing 24 has a cylindrical portion 27 having a relatively large bearing clearance as compared to metallic bearings with the cylindrical portion 16 of shaft bolt 11. At the pilot end of the bearing bushing 24 there is a pilot flange 28. The flange 28 has a tapered outer surface 29 having a smaller slope $S_1$, for example 15°, than the entrance taper 26, for example 30° slope $S_2$ of bearing sleeve 22 to permit the initial entry of flange 28 into the tapered mouth provided by taper 26 of bearing sleeve 22 to guide and pilot the initial entry of the bushing into the bore. The diameter of the entrance or initial portion of pilot flange 28 must be smaller than the diameter of the mouth of taper 26, and is preferably substantially equal to the internal diameter of the cylindrical portion of the sleeve 22 or the external diameter of the bearing bushing 24. The pilot flange 28 has an inner annular surface substantially at 90° to the cylindrical surface and forming a sharp corner. The bushing 24 has a large head flange 31 at the head end to provide a bearing surface between the lever 10 and frame 12, to provide rigidity for driving this end of the bushing and to, in conjunction with pilot flange 28, axially locate the bushing in the sleeve. Between the flange 31 and the cylindrical portion 27 of the bushing 24 there is a tapered fillet 32 having a surface fitting the taper 26 to provide full support for the bushing 24 throughout its length.

In a modified construction (FIGURE 3) in which a similar lever 10' is supported by a shaft bolt 11 on a frame 12, a modified bushing 36 is employed. The bushing 36 has a cylindrical portion 37 and a rounded pilot flange 38. The rounded pilot flange provides an external tapered portion 39 having a diameter at the small end slightly less than the internal diameter of sleeve 42. It will be noted that the inner annular edge 40 of the pilot flange 38 provides an acute angle $a$ a few degrees less than 90° angle $b$ with the cylindrical portion 37 or its axis to engage the face 41 of lever 10' which also has an acute angle a few degrees less than 90° with the bearing sleeve 42 or its axis. The lever 10' has an integrally formed bearing sleeve 42 having a rounded pilot taper 43 at the entrance edge for the bushing 36. The bushing 36 has a large flange 44 providing a thrust bearing between lever 10' and support 12. There is a fillet located between the flange 44 and the cylindrical portion 37 of the bearing bushing. It will be noted that there is a slight clearance between the fillet 46 and the taper 43 at the lever entrance portion of the bore. This clearance allows bushing 36 to be pressed inwardly or deflected beyond its final position so that the flange 38 may snap outwardly and due to the resilience of flange 44 the bushing 36 returns so edge 40 engages surface 41 on lever 10'. In this position flanges 38 and 44 bear against the sides of the member to axially locate the bushing in the sleeve.

The bearing bushings 24 and 36 are made of a bearing grade of plastic having a high wear resistance and high impact strength. The plastic must also have a high compressive strength which provides a low cold flow grade. However, the bearing material cannot be brittle but must have a sufficiently large modulus of elasticity so that the material will temporarily deform sufficiently to permit insertion. During insertion of the bearing, the material must deform under compression without reaching the yield point. In one bushing for a three-quarter inch shaft, the securing lip at the pilot flange is provided by making the maximum diameter of the pilot flange .020 to .030 larger in diameter than the external diameter of the bushing. Due to the high elasticity of these synthetic resin bearing materials as compared to metal, the bearing bushing may be inserted with a force of about 200 pounds and will return substantially to its original shape. The bearing grade of the plastic or synthetic resin known commercially as "Delrin" is particularly suited for this use. The basic material employed is polymeric formaldehyde, also known as polyoxymethylene as shown in the MacDonald Patent 2,768,993. Modified polyoxymethylenes are also disclosed in Patents 2,893,972, Kubico, 2,828,287, Cairns, and 2,795,571, Schneider. Other synthetic resins, such as "Nylon," a polyamide plastic, generally disclosed in Patents 2,071,253 and 2,130,948 and disclosed specifically for bearings in Austin, 2,246,086, and Gilman, 2,240,092, and "Teflon," a polytetrofluroethylene, are suitable for use in one-piece bearing bushing of this type.

The bearing bushing made of these materials may be formed in an annular mold and forced out of the mold without destroying the bushing. In the same way, the bushing is forcibly inserted in the bore of the lever. The shape of the bushing is not permanently changed since a bushing of this material will permit sufficient deformation while the pilot flange is passing through the bore to permit this passage without exceeding the yield point of the material.

It will be appreciated that the above illustrated modification of this invention may be modified within the scope of the appended claims.

I claim:
1. In a bearing construction, a member having a bearing bore therethrough from side to side for pivotally mounting said member on a shaft, said bearing bore having a cylindrical surface portion and at one end thereof a side of said member defining a sharply defined annular locking edge making an acute angle of slightly less than 90° with the cylindrical surface of the cylindrical surface portion of the bore and at the other end of the bore an extended pilot taper portion having a large diameter at the other end of the bore at the other side of the member and tapering inwardly to the diameter of the bore, a synthetic resin bushing located in said bore having a cylindrical portion fitting the cylindrical surface of said bore and at one end a pilot flange having a tapered portion with an initial diameter less than the large diameter of said bore, said pilot flange having an annular internal edge making a sharp corner with said cylindrical portion, said pilot flange having a maximum diameter sufficiently small so that compression of said bushing to a diameter equal to the diameter of said cylindrical surface portion of the bore does not stress said bushing beyond the yield point, and said bushing having at the other end a resilient head flange having a fillet between the head flange and said cylindrical portion fitting said pilot taper with sufficient clearance for deflection of said head flange to move said pilot flange beyond said locking edge so on return movement said pilot flange engages said locking edge.

2. In a bearing construction, a member having a bearing bore therethrough for pivotally mounting said member on a shaft, said bearing bore defining a cylindrical surface terminating in a normal face at one end and an outwardly extending tapered pilot surface at the other end, a synthetic resin bushing located in said bore having a cylindrical portion fitting said bore cylindrical surface, said cylindrical bushing portion having a pilot flange at one end and a head flange at the other end, said pilot flange having a downwardly and outwardly tapered outer annular surface which has a lesser degree of slope than said tapered pilot surface of said cylindrical bore surface, said pilot flange having a maximum diameter sufficiently small so that compression of said bushing to a diameter equal to the diameter of said cylindrical surface portion of the bore does not stress said bushing beyond the yield point, said tapered surfaces of said pilot flange and said cylindrical bore surface providing line contact therebetween when said bushing is inserted through said bearing bore whereby said bushing is subjected to minimum distortion and said pilot flange expands to engage said normal face of said member and said head flange engages an opposite side of said member.

References Cited by the Examiner

UNITED STATES PATENTS

| 1,815,631 | 7/31 | Olson. | |
| 2,166,259 | 7/39 | Meyer | 308—26 |
| 2,787,486 | 4/57 | Thiry | 287—85 |
| 2,831,737 | 4/58 | Jacoby. | |
| 2,913,284 | 11/59 | Zankl. | |
| 2,943,773 | 8/60 | Hawes | 29—451 |

FOREIGN PATENTS 926,488   4/47   France.

ROBERT C. RIORDON, *Primary Examiner.*

R. A. DOUGLAS, FRANK SUSKO, *Examiners.*